(12) United States Patent
Glöckner et al.

(10) Patent No.: US 6,938,515 B2
(45) Date of Patent: Sep. 6, 2005

(54) METHOD AND SYSTEM FOR COMPENSATING THE VIBRATIONS OF ROTATING COMPONENTS

(75) Inventors: Erhard Herbert Glöckner, Eibelstadt (DE); Bernd Ulrich Herbert Keller, Höchberg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 28 days.

(21) Appl. No.: 10/149,441

(22) PCT Filed: Dec. 6, 2000

(86) PCT No.: PCT/DE00/04338

§ 371 (c)(1),
(2), (4) Date: Jun. 26, 2002

(87) PCT Pub. No.: WO01/50035

PCT Pub. Date: Jul. 12, 2001

(65) Prior Publication Data

US 2003/0010150 A1 Jan. 16, 2003

(30) Foreign Application Priority Data

Dec. 31, 1999 (DE) .......................... 199 63 945

(51) Int. Cl.[7] .............................. F16F 15/10; B41F 5/00
(52) U.S. Cl. ........................... 74/574; 74/572; 188/378; 101/216; 464/24; 68/23.2
(58) Field of Search ....................... 74/572–574, 573 R; 101/216, 484, 375, 328, 376; 464/24; 68/23.2; 144/224; 188/378; 267/136

(56) References Cited

U.S. PATENT DOCUMENTS

| | | | | |
|---|---|---|---|---|
| 3,812,724 A | * | 5/1974 | Curtz et al. .................... | 73/458 |
| 4,125,073 A | * | 11/1978 | Bain .......................... | 101/216 |
| 4,318,309 A | * | 3/1982 | Bremer, Jr. .................. | 74/574 |
| 4,487,123 A | | 12/1984 | Köbler et al. | |
| 4,739,702 A | * | 4/1988 | Kobler ........................ | 101/216 |
| 4,742,769 A | * | 5/1988 | Zeller ......................... | 101/216 |
| 4,895,072 A | * | 1/1990 | Rich et al. ................... | 101/376 |
| 5,027,873 A | * | 7/1991 | Anselm ....................... | 144/224 |
| 5,226,365 A | * | 7/1993 | Wieland ...................... | 101/328 |
| 5,235,909 A | | 8/1993 | Gerstenberger et al. | |
| 5,348,124 A | | 9/1994 | Harper | |
| 5,365,842 A | * | 11/1994 | Panossian ................... | 101/216 |
| 5,460,017 A | * | 10/1995 | Taylor ........................ | 68/23.2 |
| 5,595,117 A | * | 1/1997 | Chrigui ...................... | 101/216 |
| 5,921,150 A | | 7/1999 | Romanauskas | |
| 6,095,922 A | * | 8/2000 | Friedrichsen et al. ......... | 464/24 |
| 6,286,427 B1 | * | 9/2001 | Smith ......................... | 101/375 |
| 6,499,401 B1 | * | 12/2002 | Koch et al. ................. | 101/484 |
| 2002/0020315 A1 | * | 2/2002 | Siebolds et al. ............. | 101/216 |

FOREIGN PATENT DOCUMENTS

| | | | |
|---|---|---|---|
| DE | 32 30 120 A1 | 2/1984 | |
| DE | 36 37 571 A1 | 5/1988 | |
| DE | 40 08 568 A1 | 9/1990 | |
| JP | 3-14944 * | 1/1991 | ................. 74/574 |
| JP | 8-61003 | 3/1996 | |
| JP | 10-309951 | 11/1998 | |
| JP | 11-058677 | 3/1999 | |
| JP | 11-170474 | 6/1999 | |
| WO | WO 94/04844 * | 3/1994 | ................. 74/574 |
| WO | WO 97/03832 | 2/1997 | |

OTHER PUBLICATIONS

Halliday Resnick, Physics, Parts I & II, Publisher: John Wiley & Sons, Inc., 1967, pp. 119 and 120.*

* cited by examiner

*Primary Examiner*—Vinh T. Luong
(74) *Attorney, Agent, or Firm*—Jones Tullar & Cooper PC

(57) ABSTRACT

Flexural vibrations are reduced in rotating components, such as rotating cylinders of a rotary printing press. One or more actuators are placed in a groove or recess in the cylinder. These actuators act in the axial direction of the rotating component. The amount of force exerted by said actuator will vary with the rotational position of the cylinder.

15 Claims, 2 Drawing Sheets

METHOD AND SYSTEM FOR COMPENSATING THE VIBRATIONS OF ROTATING COMPONENTS

FIELD OF THE INVENTION

The present invention is directed to a method, as well as to an arrangement, for reducing bending vibrations in rotating components. An actuator is arranged in the rotating component and exerts an axial force.

BACKGROUND OF THE INVENTION

A method and device for reducing bending vibrations in rotating systems in known from WO 97/0382.

U.S. Pat. No. 5,921,150 A shows an arrangement for reducing bending vibrations in rotating components by the use of an actuator arranged in the rotating component. The actuator has a force component acting in the axial direction of the rotating component.

SUMMARY OF THE INVENTION

It is the object of the present invention to reduce bending vibrations in rotating components.

In accordance with the present invention, this object is attained by the use of at least one actuator. The actuator is arranged in the rotating component and exerts a force in the axial direction of the rotating component. This force may change the axial length of the rotating component.

The advantages which can be achieved by the present invention reside, in particular, in that bending vibrations are reduced. The reduction of the so-called "channel beats" of cylinders of rotary printing presses is of particular advantage.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
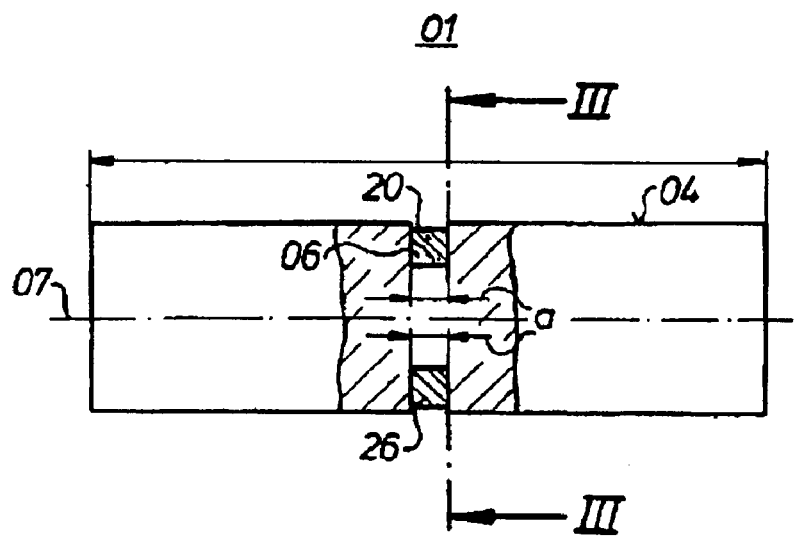
FIG. 1, a side elevation view of a cylinder of a rotary printing press in accordance with a first preferred embodiment of the present invention, in the state of rest, FIG. 2, a side elevation view of the cylinder of FIG. 1 in the operational state and showing the bending of the cylinder in an exaggerated manner, FIG. 3, a cross sectional view taken along line III—III through the cylinder of FIG. 1 and in an enlarged view, FIG. 4, a cross sectional view through a cylinder of a rotary printing press in accordance with a second preferred embodiment.

A rotating component, for example, a cylinder, such as a forme cylinder, transfer cylinder, counter-pressure cylinder, damping or guide rollers, called cylinder 01 in what follows, has journals, not represented, on both of its ends. An annular groove 06 is provided on the circumference 04 of the cylinder 01 and approximately in the center of the cylinder's barrel length 1. Annular groove 06 receives a plurality of actuators, for example actuators 20 to 31. The actuators 20 to 31 are arranged inside the circumferential line of the cylinder 01, as seen most clearly in FIGS. 1 and 2.

It is also possible to arrange several, for example three or five, annular grooves 06 on cylinder 01, which annular grooves 06 are spaced apart in the axial direction of cylinder 01 and each have actuators 20 to 31. In the axial direction means in the direction of the axis of rotation 07 of the cylinder 01.

Each annular groove 06 can be filled, for example with a curable plastic material, in the direction of the surface area of the cylinder 01.

The actuators 20 to 31 can consist, for example, of piezo elements or of double-layer elements. Alternatively, each activator can consist of a cylinder-piston unit, which can be pneumatically or hydraulically actuated.

It is furthermore advantageous to employ an actuator which has layered piezo threads with copper foil anodes. The length of this actuator is increased when a voltage is applied.

Sensors, for example piezo-ceramic printing pressure sensors, can be arranged on the surface area of the cylinder 01. These sensors can be located underneath the rubber blanket of the printing forme of the cylinder 01. The actuators 20 to 31, as well as the pressure sensors, can be connected with a control device. The control device can be arranged inside or also outside of the cylinder 01.

It is also possible to employ each actuator 20 to 31 simultaneously as a sensor.

The transfer of energy and/or transfer of information between a control device, not specifically shown, and the sensors, as well as between the control device and the actuators, is preferably made in a contactless manner.

Figure 3:
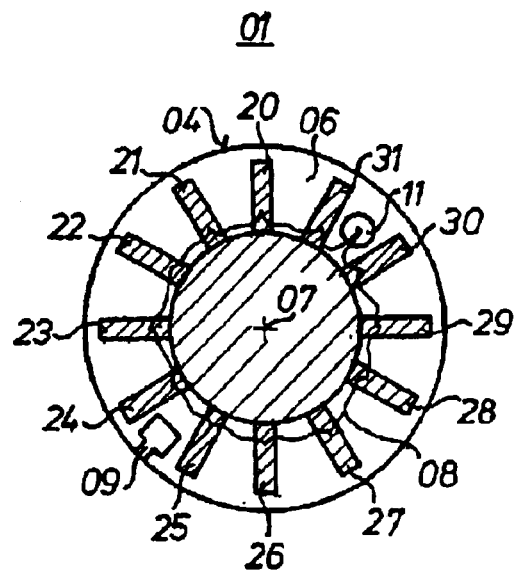

The actuators 20 to 31 can be connected with each other by a control line 08, as seen in FIG. 3.

The cylinder 01 has a channel 09, which extends in an axis-parallel direction, and is located in the vicinity of the circumference 04 of cylinder 01, as seen in FIG. 3. This channel 09 contains technical assemblies for keeping in place and/or bracing the ends of printing formes or rubber blankets of the cylinder 01 or of the roller. Also, a compensating bore 11 for receiving devices for removing imbalances can be provided in the cylinder 01.

The arrangement for compensating for vibrations, in accordance with the present invention, operates as follows: at a defined location of the circumference 04 of cylinder 01 and at one and/or several defined times, the sensors or actuators determine the actual values of the bending of the cylinder 01 in the operating state. These actual bending values are supplied to the control device, which, in turn, acts with a defined value on the respective actuators 20 to 31. These actuators 20 to 31 change their size in the axial, or nearly axial, direction of the cylinder. Nearly axial direction means a direction having at least one axial component. In this way, the cylinder 01 is stretched, extended or shortened, at one, or several defined locations at the appropriate respective time, which extending or shortening affects the bending of the cylinder 01.

A force component, or the size of a force applied by each actuator 20 to 31 as a result of the change in size of each actuator 20 to 31, in the axial or nearly axial direction of the cylinder 01, is changed as a function of the location of each actuator 20 to 31 in response to rotation of the cylinder 01.

Figure 4:
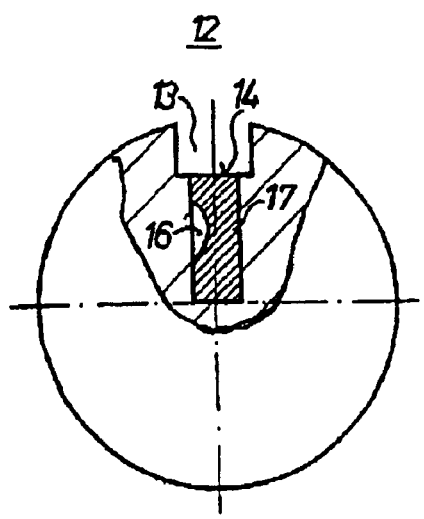

In accordance with another preferred embodiment, as depicted in FIG. 4, a rotating component, for example a cylinder 12 or a roller of a rotary printing press can have a channel 13 extending in an axis-parallel direction of the cylinder 12 which channel 13, for example, has a blind bore 16 for receiving an actuator 17 on its channel bottom area 14. This actuator 17 can be arranged at the center of the barrel length of the cylinder 12 and can be embodied in the form of so-called "adaptronics". It is, of course, also possible to arranged several similar actuators, which are spaced apart from each other in the axial direction of the cylinder 12, with each such actuator being located beneath or under the cylinder surface area.

It is also possible to provide each of the actuators 20 to 31 with a bias voltage, regardless of whether they are electrically or pneumatically operable actuators. In this case, each actuator 20 to 31 thus already has an average longitudinal extension "a", as seen in FIG. 1 in a position of rest of the cylinder 01.

Figure 2:
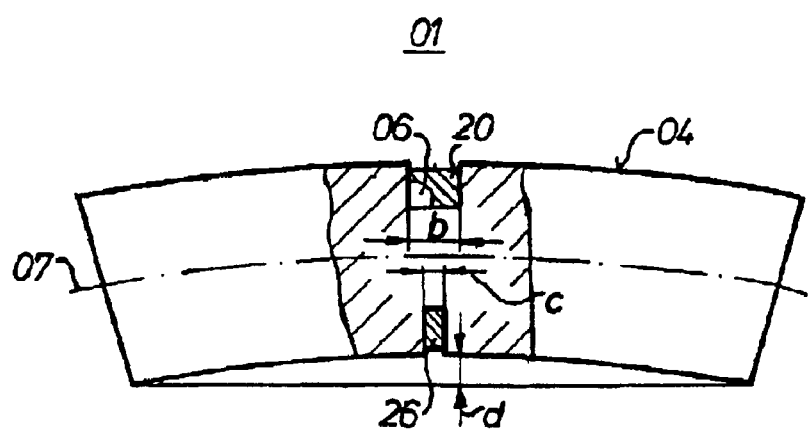

In the operating state of the cylinder 01 as depicted in an exaggerated manner in FIG. 2, an amount "d" of bending of the cylinder 01 is achieved in that the actuator 20 is charged with a voltage that is greater than its bias voltage, up to then, has amounted to, so that actuator 20 increases in size so that it now has a greater longitudinal extension. At the same time, the actuator 26 is charged with a lesser voltage than its previous bias voltage, so that it is reduced in size so that it has a lesser longitudinal extension. Because of this, the actuator 20 now has a greater length "b", and the actuator 26 now has a lesser length "c", wherein the lengths are b>a>c.

The actuators 21 to 25 and 31 to 27 located on the circumferences 04 of cylinder 01, and between the actuator 20 and the actuator 26 can each be charged with difference voltages in accordance with their angular position, so that this causes different length changes of the cylinder about its circumference 04 at a defined time.

In the course of this, the actuators 20 to 22, or 31,31 located on a first short half of the circumference 04, increase the previous amounts "a" of their longitudinal extensions, or lengths to the new amounts "b", or to amounts between "a" and "b".

The actuators 24 to 28, located on a second short half of the circumference 04, reduce the previous amounts "a" of their longitudinal extensions or lengths to the new amounts "c", or to amounts between "a" and "c".

Since the cylinder 01 rotates, the lengths of the actuators 20 to 31 continually change in accordance with the location of each actuator 20 to 31 during rotation of cylinder 01.

Vibration occurring in cylinders 01 or 12 are compensated for by use of the at, least one actuator 17 or the actuators 20 to 31. A partial change of the length of the cylinder 01 or 12 parallel with its axis of rotation 07 in generated. Bending of the cylinder is affected by this partial change of length.

The size of an amplitude of bending vibrations is reduced and/or a frequency of the bending vibrations is changed by use of the actuator 17 or the actuators 20 to 31. The bending vibrations can also affect other types of vibrations, in particular torsional vibrations.

While preferred embodiments of a method and system for compensating for the vibration of rotating components, in accordance with the present invention, have been set forth fully and completely hereinabove, it will be apparent to one of skill in the art that changes in, for example supports for the cylinder, a drive assembly for the cylinder and the like, can be made without departing from the true spirit and scope of the present invention which is accordingly to be limited on by the appended claims.

What is claimed is:

1. A device for reducing rotationally induced bending vibrations comprising:

a rotating cylinder having a cylinder barrel with a barrel length;

an axis of rotation of said rotating cylinder, and extending in a direction of said barrel length, said cylinder being rotatable about said cylinder axis of rotation;

a circumferential surface area of said rotating cylinder barrel;

a plurality of actuators arranged in said rotating cylinder beneath said circumferential surface of said cylinder barrel and offset within said rotating cylinder from said axis of rotation, said plurality of actuators each having an actuator length in a direction of said axis of rotation of said rotating cylinder, said barrel length being substantially greater than said actuator length; and means for varying said actuator length of each of said plurality of actuators during rotation of said rotating cylinder as a function of a rotation position of each of said plurality of actuators in said rotating cylinder, said actuator length of each of said plurality of actuators being increased and decreased during each rotation of said rotating cylinder.

2. The device of claim 1 wherein said plurality of actuators are arranged in said direction of said axis of rotation.

3. The device of claim 1 wherein said plurality of actuators are arranged in a ring shape in said rotating cylinder barrel.

4. The device of claim 1 further including an annular groove in said rotating cylinder and wherein said plurality of actuators are located in said annular groove.

5. The device of claim 4 further including means for closing said annular groove at said circumferential surface area of said rotating cylinder.

6. The device of claim 1 further including a plurality of annular grooves in said rotating cylinder, each of said annular grooves containing a plurality of said actuators.

7. The device of claim 1 wherein each of said plurality of actuator is an piezo element.

8. The device of claim 1 wherein each of said plurality of actuators is a sensor.

9. The device of claim 1 wherein said rotating cylinder is a forme cylinder.

10. The device of claim 1 wherein said rotating cylinder is a transfer cylinder.

11. The device of claim 1 wherein said rotating cylinder is a counter-pressure cylinder.

12. The device of claim 1 wherein said rotating cylinder is a roller.

13. The device of claim 1 wherein said plurality of actuators are arranged in a circumferential direction of said rotating cylinder.

14. A method for compensating for rotationally induced bending vibrations including:

providing a rotating cylinder subject to rotationally induced bending vibrations and having a cylinder barrel with a cylinder barrel length;

providing a circumferential surface area of said rotating cylinder barrel;

providing a plurality of actuators beneath said circumferential surface of said rotating cylinder barrel;

providing an axis of rotation of said rotating cylinder and extending in a direction of said cylinder barrel length;

locating said plurality of actuators in said rotating cylinder and offset from said axis of rotation of said rotating cylinder;

providing each of said plurality of actuators with an actuator length extending in a direction of said axis of rotation, said barrel length being substantially greater than said actuator length;

operating each of said plurality of actuators for changing said actuator length in said direction of said axis of rotation; and changing said length of each of said plurality of actuators in said direction of said axis of rotation of said rotating cylinder for increasing and decreasing said actuator length during each rotation of said rotating cylinder.

15. The method of claim 14 further including changing a size of at least one of an amplitude of vibrations and a frequency of vibrations of said rotating cylinder using said plurality of actuators.

* * * * *